United States Patent [19]

Lalonde

[11] 4,292,791
[45] Oct. 6, 1981

[54] CUTTING AND MULCHING LAWN MOWER BLADE ASSEMBLY

[76] Inventor: Jean-Paul Lalonde, 2 ouest, rue Saint-Jean Baptist, Rigaud, Quebec, Canada, JOP 1PO

[21] Appl. No.: 194,035

[22] Filed: Oct. 6, 1980

Related U.S. Application Data

[63] Continuation of Ser. No. 9,451, Feb. 6, 1979, abandoned.

[51] Int. Cl.³ ............................................ A01D 55/18
[52] U.S. Cl. ........................................ 56/255; 56/295
[58] Field of Search ................ 56/295, 255, 17.5, 13.4

[56] References Cited

U.S. PATENT DOCUMENTS

| | | | |
|---|---|---|---|
| 2,734,327 | 2/1956 | Whitney | 56/13.8 |
| 2,957,295 | 10/1960 | Brown | 56/17.5 |
| 2,970,419 | 2/1961 | Lieberman | 56/17.5 |
| 2,976,666 | 3/1961 | Machavec | 56/295 |
| 3,382,653 | 5/1968 | Buigne | 56/17.5 |
| 4,134,249 | 1/1979 | Wuerker et al. | 56/255 |
| 4,161,096 | 7/1979 | Biberger | 56/295 |

*Primary Examiner*—Robert A. Hafer

[57] ABSTRACT

A cutting and mulching blade assembly for a rotary lawn mower characterized by being adapted for fine mulching of even long grass and blowing of the grass cuttings away from the internal surface of the shroud housing of the mower back on the lawn among the remaining grass, such as to obviate the need for raking. The self-cleaning feature also allows making the shroud housing without lateral outlets for more safety. This cutting and mulching blade assembly comprises a mulching blade made of essentially the same blank as a conventional lawn mower blade and operatively secured to such cutting blade by a hub member for bodily rotation together and with the mulching blade formed to blow the grass cuttings inward and downward back on the lawn.

1 Claim, 7 Drawing Figures

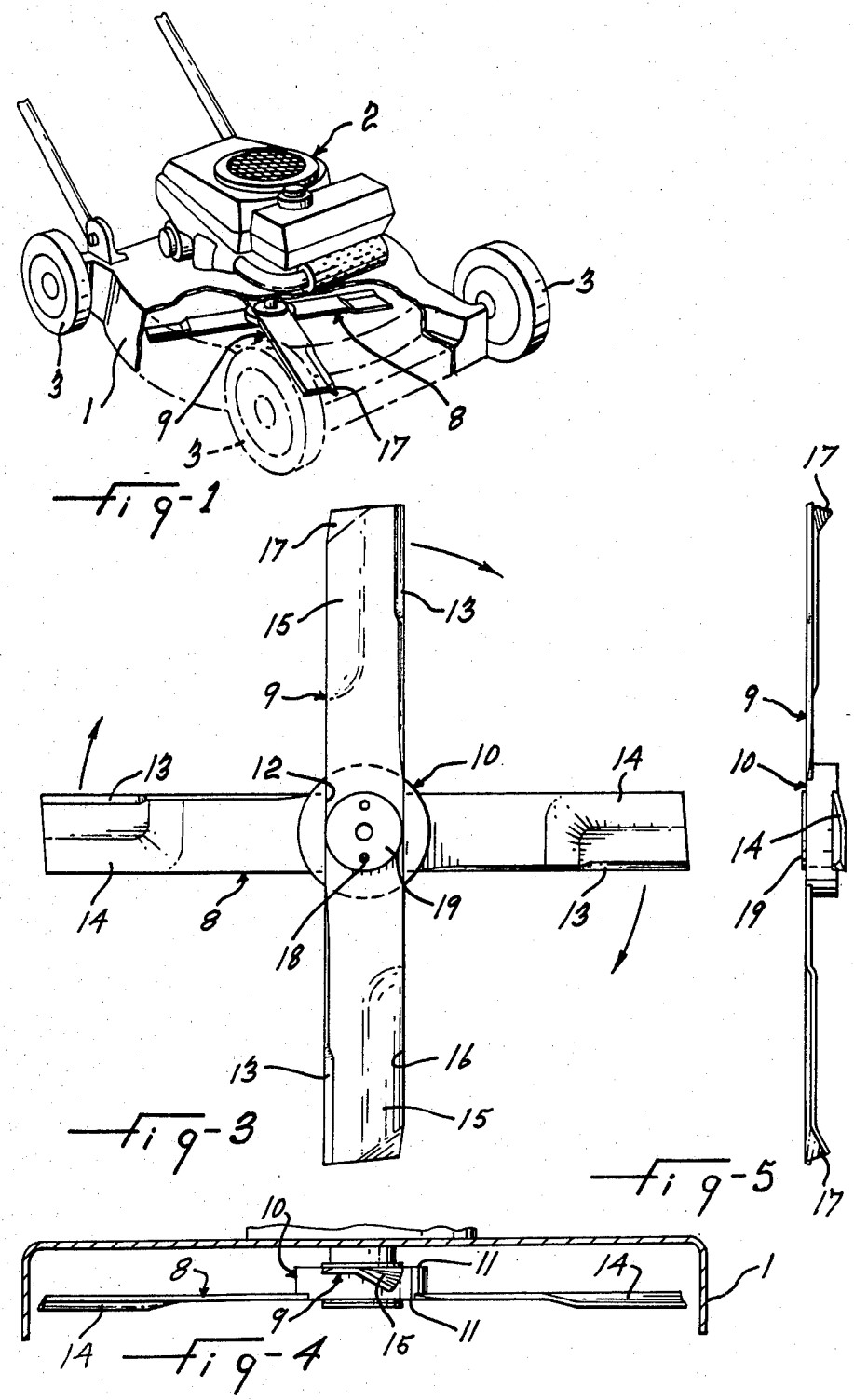

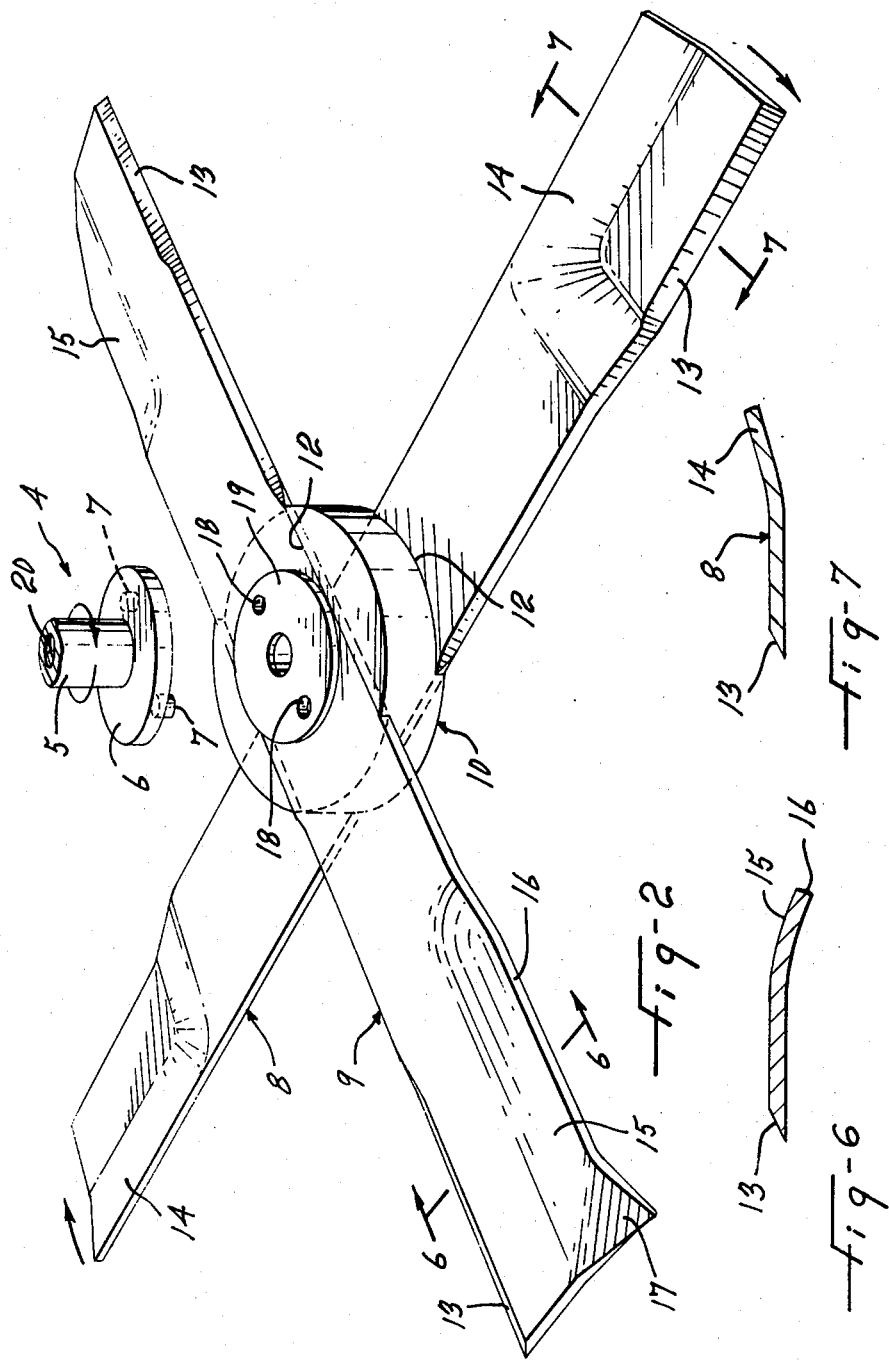

4,292,791

CUTTING AND MULCHING LAWN MOWER BLADE ASSEMBLY

This application is a continuation of Ser. No. 009451, filed Feb. 2, 1979 now abandoned.

This invention relates to rotary lawn mowers and, more particularly, to a cutting and mulching blade assembly of the type adapted for a rotary lawn mower.

It is a general object of the present invention to provide a blade assembly for rotary lawn mower which produces efficient mulching of the grass.

It is another general object of the present invention to provide a cutting and mulching blade assembly of the above type, which is adapted to produce self-cleaning inside the shroud housing of the mower and of the internal surface of the same housing.

It is a more specific object of the present invention to provide a cutting and mulching blade assembly of the above type wherein the grass is finely mulched and blown downward outwardly of the shroud housing of the lawn mower to keep the latter clean and simultaneously feed the lawn therewith, while avoiding raking of the grass.

It is another object of the present invention to provide a cutting and mulching blade assembly of the above type, wherein the grass cuttings are blown downward, thus avoiding the need for a lateral outlet in the shroud housing and the associated risks of injuries by outwardly propelled obstacles, such as rocks, sticks or the like, or by engagement of one's foot therethrough in the path of the rotating blade.

It is a further general object of the present invention to provide a cutting and mulching blade assembly of the above type, which has no lateral outlet simultaneously combined with self-cleaning as aforementioned, thereby preventing clogging despite removal of the lateral outlet.

It is a still further object of the present invention to provide a cutting and mulching blade assembly of the above type wherein there is provided a mulching blade above the cutting blade diametrically co-extensive therewith, and arranged to blow the grass cuttings downward and radially inward and to effectively cut even very long grass.

It is still another object of the present invention to provide a cutting and mulching blade assembly of the above type, wherein there is provided a mulching blade in cooperation with a conventional cutting blade with both blades having essentially the same basic construction for economical manufacturing thereof from the same basic blank.

The above and other objects and advantages of the present invention will be better understood with reference to the following detailed description of a preferred embodiment thereof which is illustrated, by way of example, in the accompanying drawings, in which:

FIG. 1 is a perspective view of a rotary lawn mower provided with a cutting and mulching blade assembly according to the present invention;

FIG. 2 is a perspective view of the cutting and mulching blade assembly attached to the lawn mower of FIG. 1;

FIG. 3 is a top plan view of the same assembly;

FIGS. 4 and 5 are side views of the same assembly seen endwise from one end of the mulching blade and the cutting blade respectively;

FIGS. 6 and 7 are cross-sectional views of the mulching blade and cutting blade as seen along lines 6—6 and 7—7, respectively in FIG. 2.

The illustrated cutting and mulching blade assembly is, according to the present invention, adapted to be installed in a rotary lawn mower which, as shown in FIG. 1, conventionally includes a shroud housing 1, a motor 2, and wheels 3. The motor 2 is provided with a depending shaft projection which, for instance, may be of the type indicated by the reference numeral 4 in FIG. 2. This depending shaft projection 4 downwardly extends in the space confined by the shroud housing 1. The depending shaft projection 4 includes a vertical shaft 5 having an annular flange, or disc 16, rigidly secured to the lower end thereof. A pair of studs 7 axially project from the lower face of the flange or disc 6.

The illustrated cutting and mulching blade assembly comprises an elongated cutting blade 8, an elongated mulching blade 9, and a hub member or disc 10.

The hub member 10 is annular or in the form of a disc with a central aperture axially therethrough. The hub member 10 has axially opposite flat faces 11, each formed with a flat recess 12 therein extending at right angle relative to the flat recess 12 of the other flat face 11.

The two elongated blades 8 and 9 are conveniently formed from identical blanks with the attendant advantages. Each of the two blades is of substantially equal length and includes an intermediate hub portion and opposite end portions. Each end portion of blades 8 and 9 is formed with a cutting edge portion 13 along the leading edge.

The opposite end portions of the cutting blade 8 are each formed with a trailing edge portion 14, which is inclined transversely of the blade upwardly in a direction away from the corresponding leading edge 13, as shown in FIGS. 2, 5 and 7. It must be noted that the afore-described cutting blade 8 is of conventional construction.

The opposite end portions of the mulching blade 9 are each formed with a trailing edge portion 15 which is inclined transversely of the blade downwardly toward the corresponding trailing edge 16, that is in a direction away from the corresponding leading edge 13, as shown in FIGS. 2, 4, 5, and 6. The trailing edge portions 15 of the mulching blade are also each provided with a downwardly bent tip portion 17. As shown, tip portion 17 forms an underface which is flat and is inclined to the longitudinal axis of mulching blade 9 radially inwardly in the direction of the trailing edge 16.

It must be noted that the two blades 8 and 9 are coextensive in length or diametrically relative to the rotation axis thereof. It must also be noted that each trailing edge portion 15 of mulching blade 9 extends longitudinally of blade 9 from the radially outer end of the blade 9 towards hub member 10 for a greater distance than the corresponding longitudinal extent of the trailing edge portion 14 of cutting blade 8.

The blades 8 and 9 are mounted with their intermediate hub portion in one recess 12 and flush with the corresponding flat face 11. The blades are operatively positioned, as shown and described, such that the mulching blade is above and at right angle to the cutting blade and at a predetermined axial spacing from it to finely mulch the grass.

The assembly is secured to the shaft projection 4 after engagement of the studs 7 in appropriate apertures 18 of a washer 19. A central bolt, not shown, axially engages through the central aperture of the hub member 10 and is screwed in the threaded axial bore 20 of the shaft projection 20.

Obviously, the mode of securing the assembly depends on the particular mode of securing the conventional cutting blade in any particular type of lawn mower and such detail does not form part of the present invention, since the hub member may easily be made to accommodate most and probably all situations.

It must be also noted that the inclined portions 15 of the mulching blade 9 will blow the grass cuttings downwardly back among the remaining grass, while the bent trailing edge tip portion 17 increases the down blowing action of portions 15 and further produces a draft near the internal lateral surface of the shroud housing 1 to keep the latter clean by inducing a radially inward flow of the grass cuttings.

What I claim is:

1. A cutting and mulching blade assembly for a rotary lawn mower having a motor and a depending shaft projection, said assembly comprising a mulching blade and a hub member operatively used in cooperation with a cutting blade, said assembly being operatively securable to said depending shaft projection, each of said blades being of substantially equal length and each having a pair of opposite end portions, said hub member operatively connecting said blades at generally right angles to each other for bodily rotation about the axis defined by said shaft projection and with the mulching blade spaced above the cutting blade by said hub member which is located between the two blades, each of said end portions of said two blades having a cutting leading edge, each end portion of the cutting blade having, transversely of the cutting blade, a rearwardly and upwardly inclined trailing edge portion, which extends longitudinally of said cutting blade from the outer end of the respective end portions of said cutting blade to a termination point short of said hub member, each end portion of the mulching blade having, transversely of said mulching blade, a rearwardly and downwardly inclined trailing edge portion terminated by a trailing edge, said trailing edge portion of said mulching blade extending longitudinally of said mulching blade from the outer end of the respective end portions of said mulching blade to a termination point closer to said hub member than the corresponding termination point of the trailing edge portion of said cutting blade, said trailing edge portion of said mulching blade operatively producing a downward flow action upon rotation and further having at its outer end a downwardly and rearwardly bent trailing edge tip portion forming an underface which is inclined relative to the longitudinal axis of the mulching blade radially inwardly in the direction of said trailing edge, said tip portion operatively impelling the grass cuttings radially inward away from the internal surface of the shroud housing operatively surrounding the assembly.

* * * * *